United States Patent

Crick

[11] 4,026,633
[45] May 31, 1977

[54] OPTICAL FIBER CONNECTOR

[75] Inventor: Aubrey M. Crick, Epping, England

[73] Assignee: International Standard Electric Corporation, New York, N.Y.

[22] Filed: May 10, 1976

[21] Appl. No.: 685,114

[30] Foreign Application Priority Data

June 19, 1975 United Kingdom .............. 26106/75

[52] U.S. Cl. ............................................. 350/96 C
[51] Int. Cl.² ......................................... G02B 5/16
[58] Field of Search ................................ 350/96 C

[56] References Cited
UNITED STATES PATENTS

| 3,504,984 | 4/1970 | Bush | 350/96 C X |
| 3,982,815 | 9/1976 | Nakayama | 350/96 C |

OTHER PUBLICATIONS

M. A. Bedgood, J. Leach, M. Mathews "Demountable Connectors for Optical Fiber System" Electrical Comm. vol. 51 No. 2, 1976 pp. 85–91.

*Primary Examiner*—John K. Corbin
*Assistant Examiner*—Rolf Hille
*Attorney, Agent, or Firm*—Thomas L. Peterson

[57] ABSTRACT

An optical fiber connector in which the fiber terminations are cylindrical but have a protruding circumferential triangular cross-sectional ridge. Two terminations are aligned in end-to-end butting relationship in a hole through a resilient receptacle which has grooves corresponding to the ridges but at a slightly closer separation so that they urge the terminations into contact with each other.

5 Claims, 1 Drawing Figure

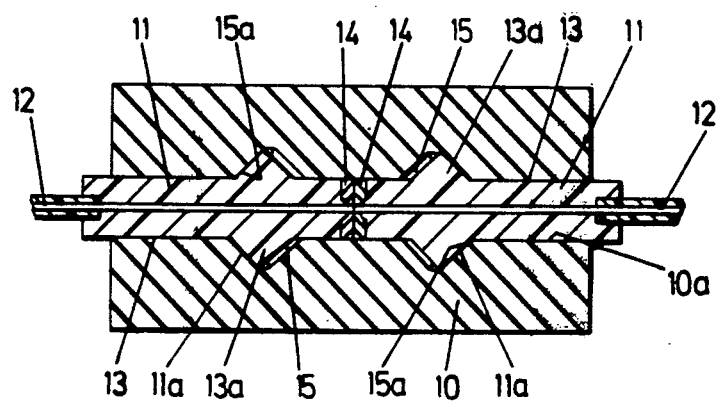

OPTICAL FIBER CONNECTOR

BACKGROUND OF THE INVENTION

This invention relates to an optical fiber demountable connector.

In an optical fiber connector there needs, on account of the very small diameter of optical fibers, to be very critical alignment of the end of one fiber with that of another in order to achieve a satisfactory coupling efficiency. This alignment is achieved by the provision of reference surface on the fiber terminations relative to which the positions of the fibers are accurately known. In the connector these reference surfaces are brough into alignment by registering them with a third reference surface. In principle the reference surfaces on the fiber terminations could be provided by the side walls of the bare fibers themselves, but in practice this would be difficult in a demountable connector on account of the extreme fragility of bare fibers. Instead it is usually preferred to provide each optical fiber end with a larger, more robust, reference surface in the form of a circularly symmetrical collar into one end of which an optical fiber extends and is secured so that, at the other end of the collar, the fiber and the collar axis are accurately aligned. In this context it is to be noted that a plastic coated optical fiber is not necessarily concentric within its plastic coating, and hence care must be taken to ensure that in the securing the end of a plastic coated fiber within a collar the alignment of the collar is determined with reference to the fiber itself rather than with reference to its coating. The purpose of the present invention is to provide a demountable connector for accurately aligning and holding the termination collars of a pair of optical fibers in butting relationship.

SUMMARY OF THE INVENTION

According to the principal aspect of the present invention there is provided an optical fiber demountable connector including a pair of optical fibers held butted together in end-to-end relationship in a hole in a resilient coupling receptacle. The fiber ends to be butted together are each secured inside an associated collar to terminate at one end thereof with the fiber aligned with the collar axis. Each collar is an interference fit in the receptacle hole and includes a rear-facing bevel between one partion and a portion of enlarged diameter nearer the free end of the collar. The receptacle hold is provided with complementary bevels at a spacing such that when they are engaged by the collar bevels they act to urge the collar ends into contact with each other.

BRIEF DESCRIPTION OF THE DRAWING

The drawing illustrates the preferred embodiment of the connector of the present invention in longitudinal section.

DESCRIPTION OF THE PREFERRED EMBODIMENT

The optical fiber demountable connector of the invention comprises essentially a resilient molded receptacle 10, made for instance of a silicon rubber, having a through hole 10a into the opposite ends of which are fitted the terminations 11 of a pair of plastic coated glass optical fibers 12.

Each optical fiber termination 11 consists of a collar having a cylindrical surface 13 interrupted by a circumferential ridge 13a of triangular cross section. These collars are made of an epoxy resin, and terminate at their free ends in watch pierced bearing jewels 14. The optical fiber threading each collar is arranged to terminate with its end flush with the face of the jewel 14 where it is held aligned with the collar axis. In a typical construction the collars are about 15 mm long and 2 mm in diameter with ridges 4 mm in diameter.

The through hole 10a in the receptacle 10 is provided with triangular cross-sectioned circumferential recesses 15 generally corresponding in form to the ridges 13 on the collars. The cylindrical portions of the collars are in interference fit in the parallel-sided portions of the through hole 10a, but the recesses 15 are arranged to be at a slightly closer spacing than that of the corresponding ridges 13 on the collars when the collars are butted together. This difference in spacing is arranged such that the ridges of both collars can be simultaneously engaged with their co-operating recesses, and that when this occurs the inwardly facing walls 15a of the recesses bear against the rear-facing walls 11a of the collars with sufficient force to overcome the friction and drive the two collars together into end-to-end butting relationship.

A resilient mold of silicon rubber (not shown) is used for making the collars on the ends of the optical fibers. The fibers are plastic coated glass fibers having an overall diameter of about 1 mm while the diameter of the actual glass fiber is about 70 mm. The mold for the collar is made with a pattern having the requisite ridge configuration. When this pattern is removed after the mold has been cured, a watch pierced bearing jewel is selected having a bore that is a sliding fit over the bared end of the fiber, and this jewel is placed in the bottom of the mold with its oil retaining recess facing inwardly. Next the mold is placed over the bared end of the fiber and gently agitated to make the fiber end slide over the polished surface of the oil retaining recess and into the hole. Once the bared fiber has been threaded through the jewel, the assembly is inverted and the fiber withdrawn until the plastic coating protudes only a short distance into the mold but the bared fiber end still protrudes beyond the jewel. The mold is then filled with epoxy resin, introduced with the aid of a hypodermic syringe. After the resin has been cured, the collar is removed from the mold complete with its jewel, and the end face is lapped flat and polished.

It may be noted that this use of a jewel serves two functions in that it provides a means of holding the bared fiber end accurately centered on the axis of the collar, and also provides an abrasion resistant end surface for the completed collar. In a modification of the above described connector the receptacle 10 is replaced with one having a set of through holes identical in configuration with that of receptacle 10 in order to provide a multiway connector assembly incorporating a set of pairs of end-to-end butted collar terminated optical fibers.

What is claimed is:

1. An optical fiber demountable connector comprising:
   a resilient coupling receptacle having a hole therethrough;
   a pair of optical fibers held butted together in end-to-end relationship in said hole;
   the butting end of each said fiber being secured inside a terminating collar and terminating at one end thereof with the fiber aligned with the collar axis;

each said collar having an interference fit in the receptacle hole and including a rear-facing bevel between one portion and a portion of enlarged diameter nearer the free end of the collar; and the receptable hole having generally complementary bevels at a spacing such that when the bevels are engaged by the collar bevels they act to urge the free ends of the collars into contact with each other.

2. A connector as set forth in claim 1 wherein:
each collar has a cylindrical surface interrupted by a circumferential ridge intermediate its ends, said ridge including said bevel.

3. A connector as set forth in claim 2 wherein:
said ridge is triangular in cross-section.

4. A connector as set forth in claim 1 wherein:
said collars are made of resin and terminate at their free ends with watch pierced bearing jewels.

5. An optical fiber demountable connector comprising:
a resilient coupling receptacle having a hole therethrough;

a pair of optical fibers each terminated by a collar, said collars having mating end faces facing each other in said hole;

each said collar having a rear-facing bevel; and said receptacle hole having generally complementary bevels at a spacing such that when said hole bevels are engaged by said collar bevels they cooperate to urge said mating end faces into abutting engagement.

* * * * *